United States Patent [19]

Kuhne

[11] Patent Number: 4,635,968

[45] Date of Patent: Jan. 13, 1987

[54] METHOD AND APPARATUS FOR PROTECTING CONSECUTIVE MULTIPLE VARIABLE DIAMETER COUPLINGS

[75] Inventor: Karl F. Kuhne, Spring, Tex.

[73] Assignee: Carbide Blast Joints, Inc., Houston, Tex.

[21] Appl. No.: 802,513

[22] Filed: Nov. 26, 1985

Related U.S. Application Data

[63] Continuation-in-part of Ser. No. 732,703, May 10, 1985.

[51] Int. Cl.$^4$ ............................................. F16L 55/00
[52] U.S. Cl. .................................... 285/45; 138/147; 166/243; 29/157 R
[58] Field of Search .................. 285/45; 138/147, 155; 166/243; 29/157 R

[56] References Cited

U.S. PATENT DOCUMENTS

| | | | |
|---|---|---|---|
| 320,683 | 6/1885 | Phillis | 285/45 X |
| 1,880,269 | 10/1932 | Murray | 285/45 X |
| 2,925,097 | 2/1960 | Duesterberg | 138/64 |
| 3,382,930 | 5/1968 | Ribb et al. | 166/242 |
| 4,028,796 | 6/1977 | Bergstrom | 29/416 |
| 4,141,386 | 2/1979 | Bergstrom | 138/147 |
| 4,211,440 | 7/1980 | Bergstrom | 285/45 |
| 4,349,050 | 9/1982 | Bergstrom et al. | 138/147 |
| 4,381,821 | 5/1983 | Greene, Jr. | 166/243 |

*Primary Examiner*—Thomas F. Callahan
*Attorney, Agent, or Firm*—Arnold, White & Durkee

[57] ABSTRACT

There is provided a protective method and joint for multiple consecutive production tubing each having a body portion and an increased diameter portion within a zone to be protected, the method including the steps of installing a plurality of first generally cylindrical annular protective rings coaxially over the body portion of each tubular; placing a plurality of second generally cylindrical annular protective rings coaxially locatable along the increased diameter portion of each tubular over the body portion of the first tubular while supporting the second protective rings with at least one sleeve coaxially located along the body portion of the first tubular; coupling a second tubular to the first tubular to form coupled tubulars; and placing the second protective rings over the increased diameter portion of the second tubular while using at least one sleeve to limit movement of the second protective rings in their radial direction and facilitate movement of those rings over the increased diameter and body portions of the coupled tubular. The apparatus includes a sleeve coaxially located along the body portion of the first tubular, the sleeve forming an extension of the increased diameter portion. The apparatus also includes at least two transition ring formations and a plurality of first and second generally cylindrical annular protective rings coaxially locatable with the body portion and the increased diameter portion and sleeve, respectively. The transition ring formation is located between the first and second protective rings and may include a transition ring, a supporting ring and a compensating ring which are sealingly biased with the protective rings against two retainers by a biasing means to thereby form a protective shield for multiple consecutive tubulars capable of accommodating longitudinal movement of the production tubing relative to the protective joint as well as flexing in the production string.

11 Claims, 20 Drawing Figures

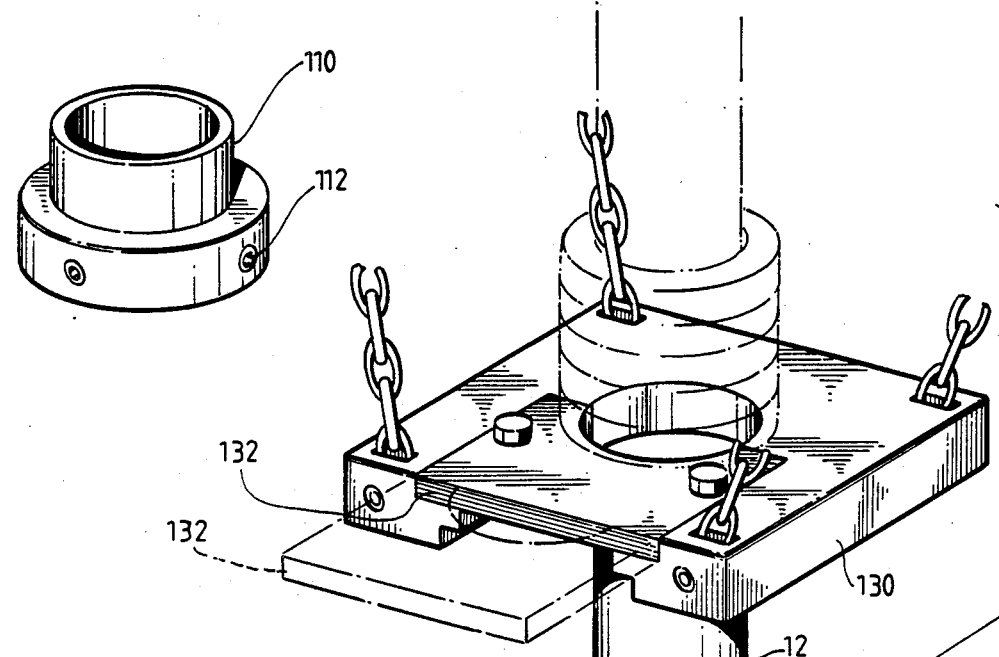
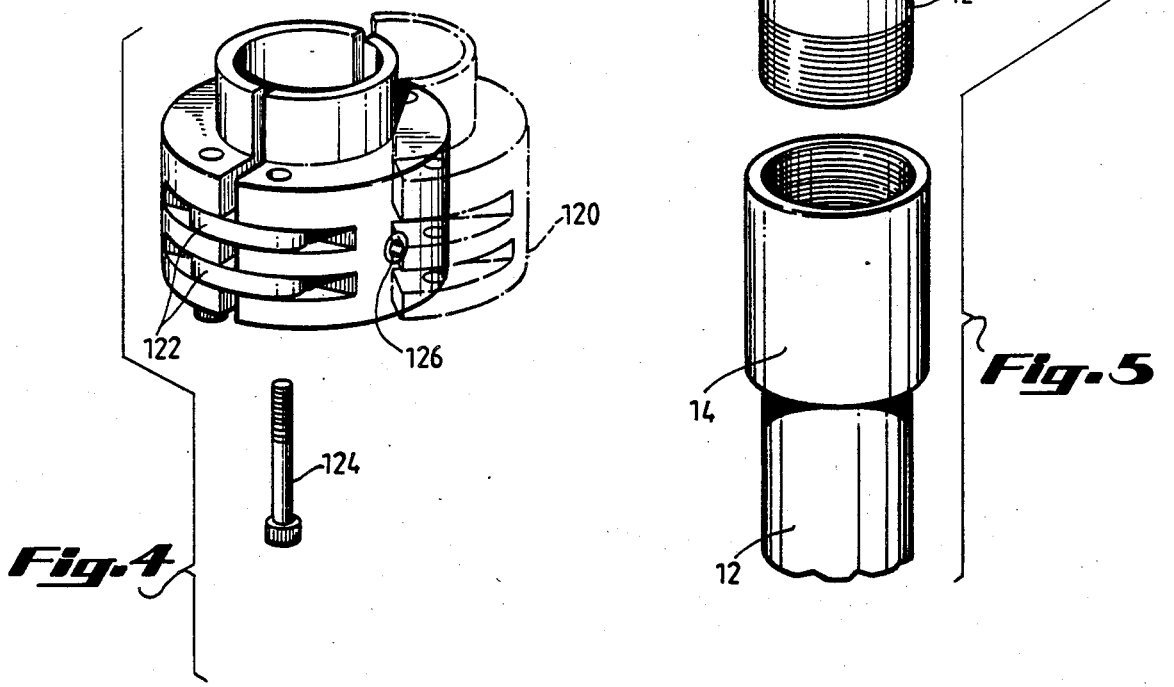

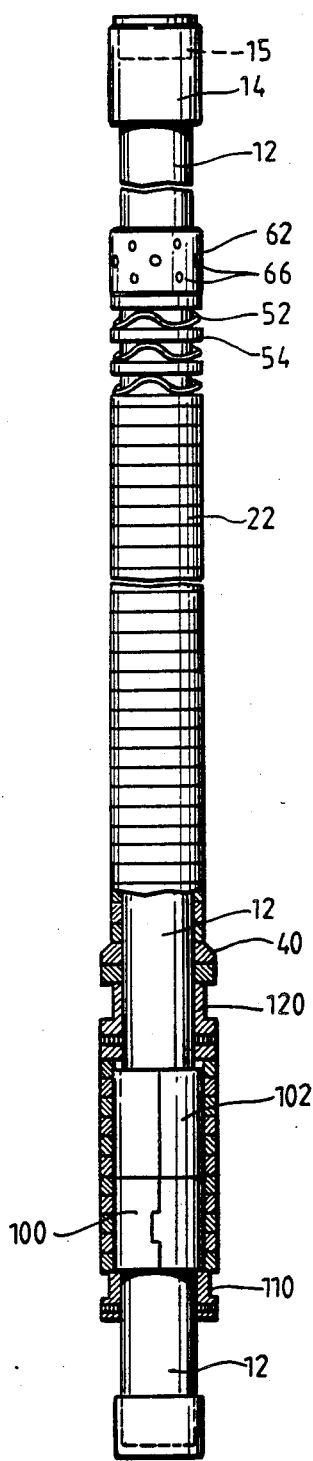
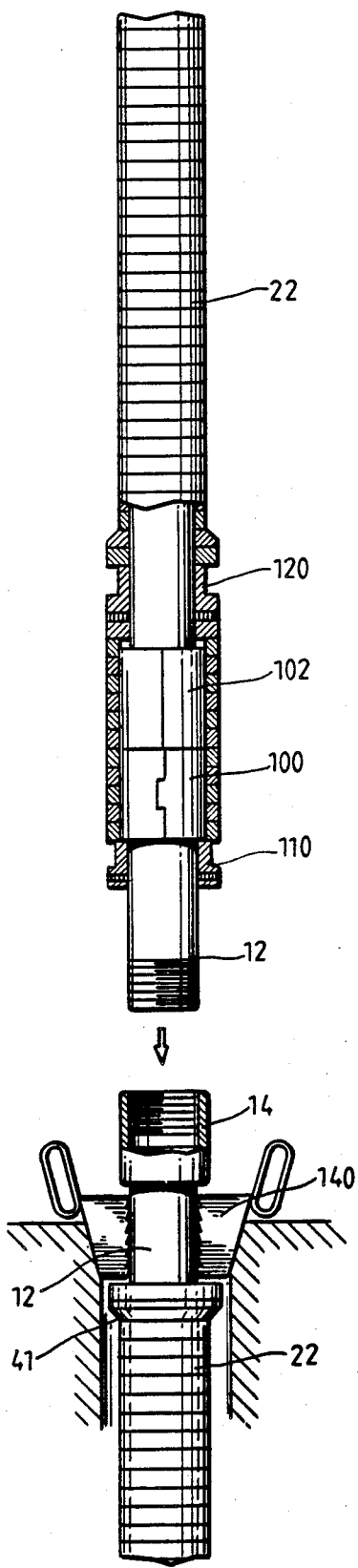
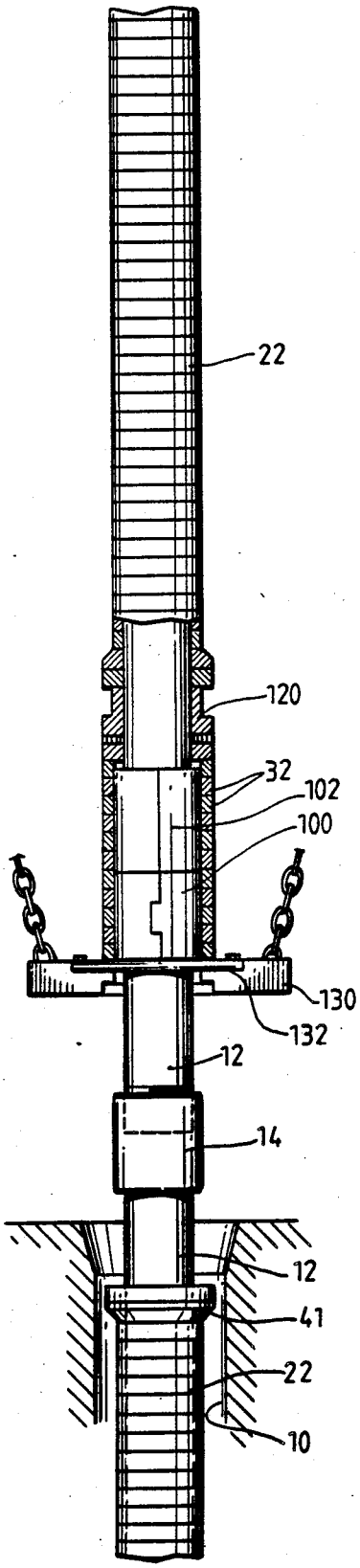

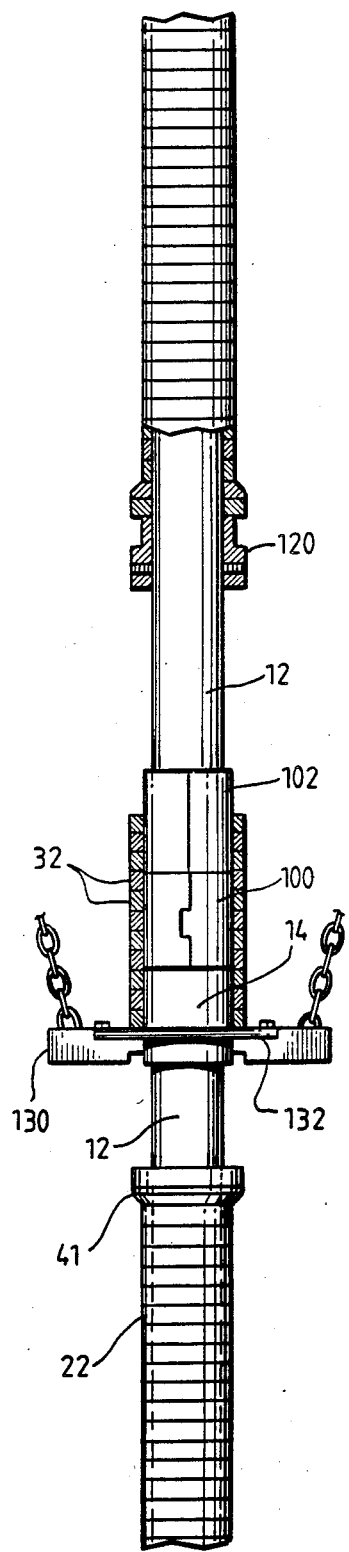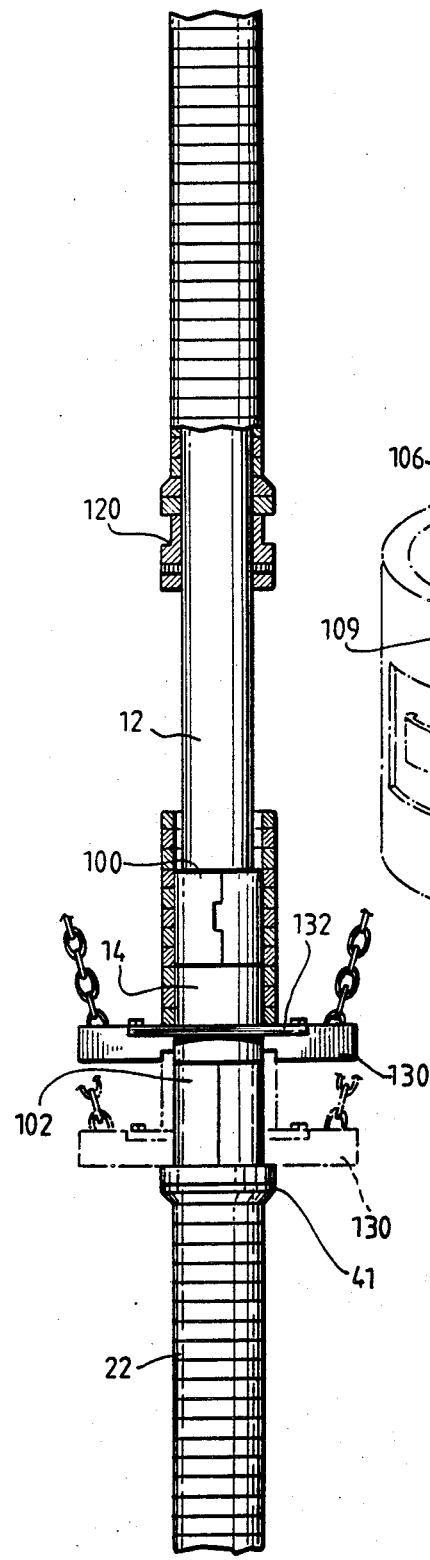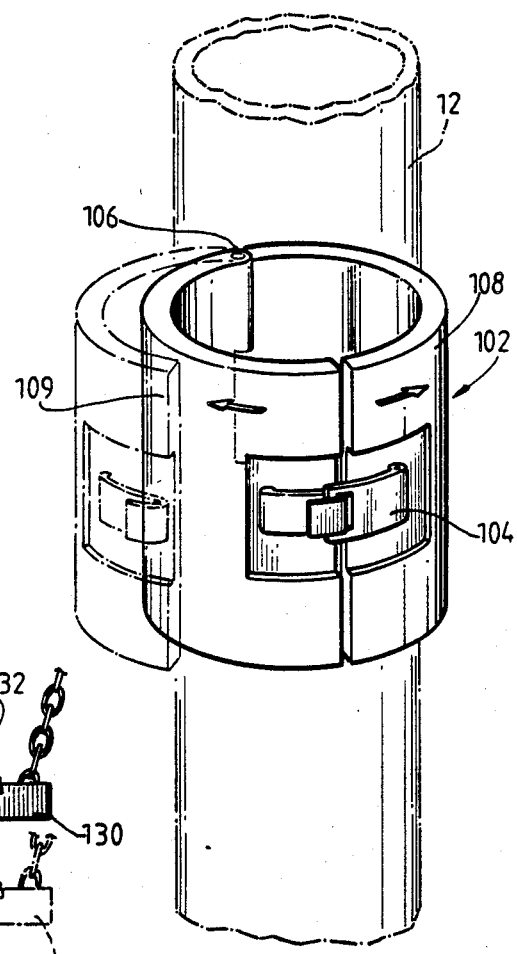

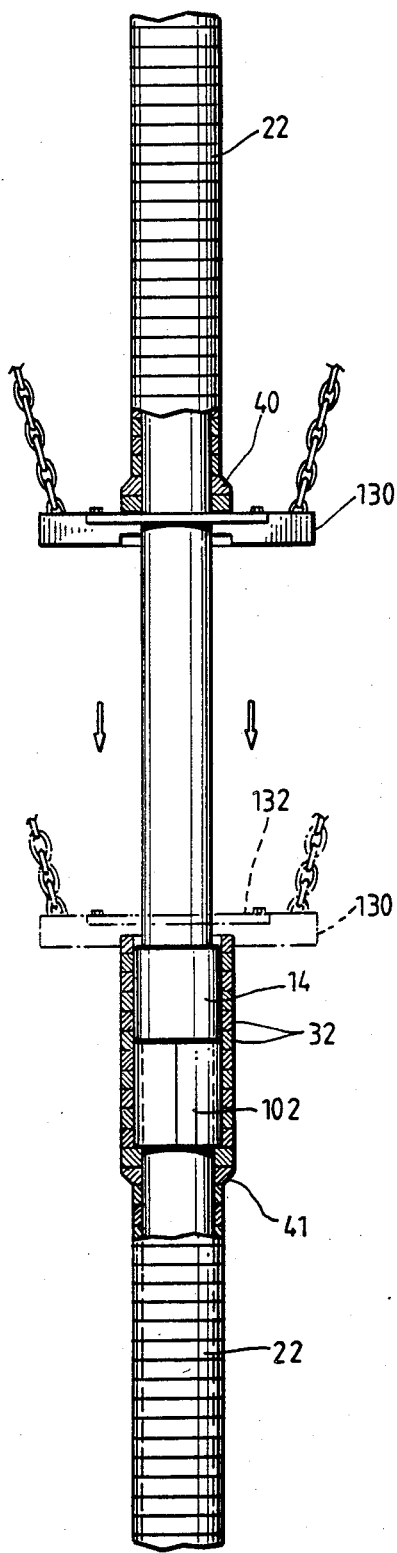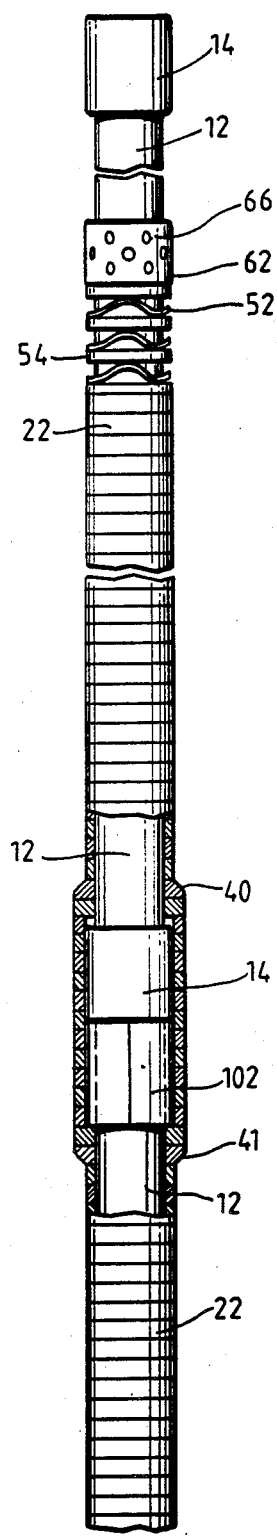

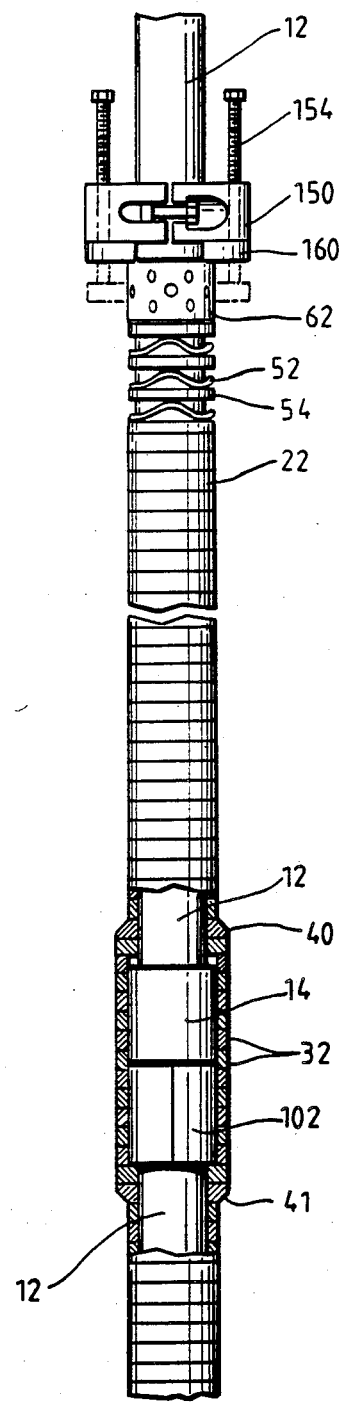
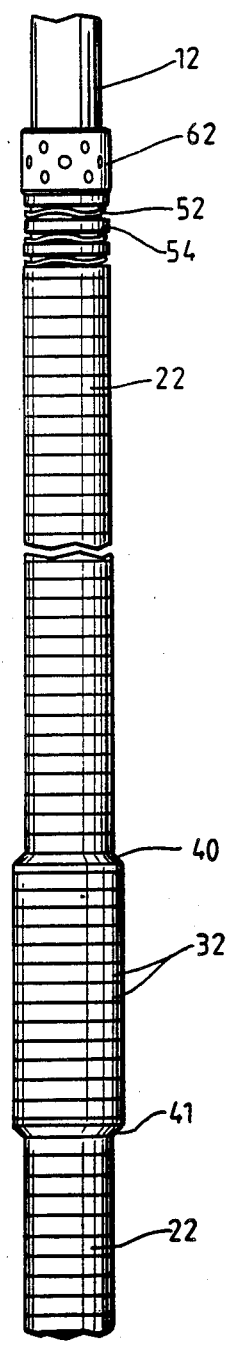

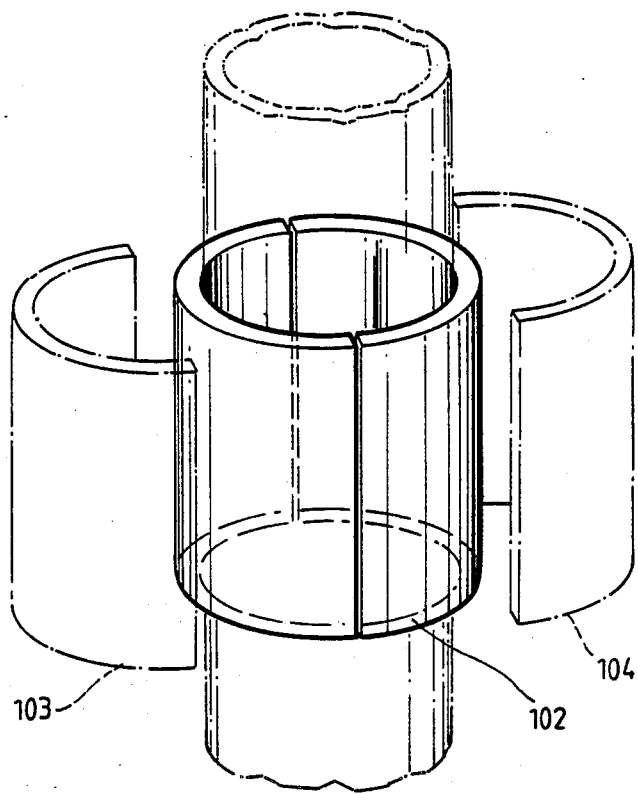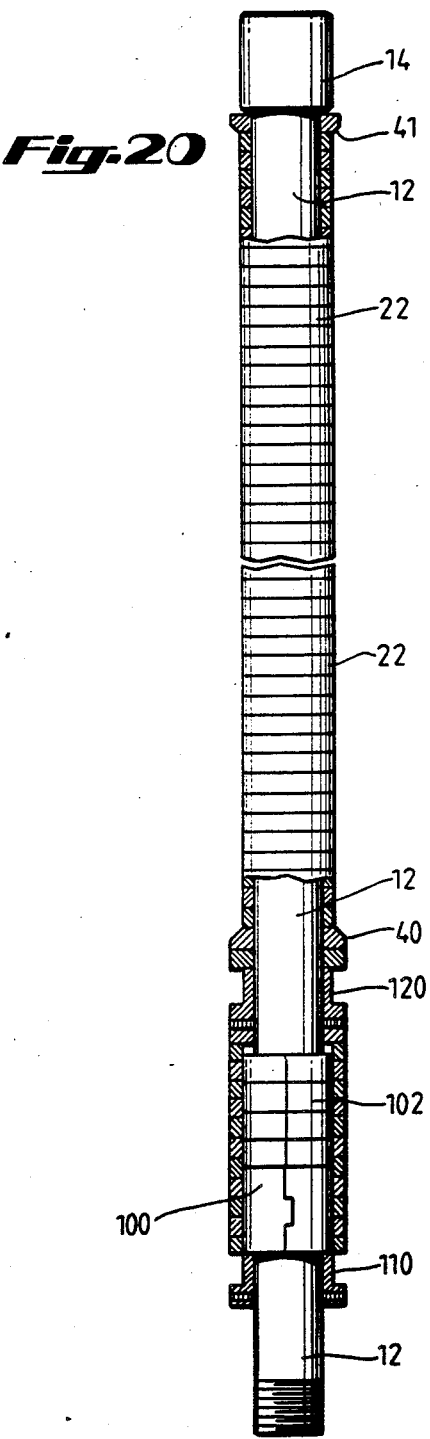

METHOD AND APPARATUS FOR PROTECTING CONSECUTIVE MULTIPLE VARIABLE DIAMETER COUPLINGS

BACKGROUND OF THE INVENTION

This application is a continuation-in-part of U.S. patent application No. 732,703, filed May 10, 1985 and entitled "Increased Tensile Strength Variable Diameter Protective Joint."

The invention pertains to a method of installing a protective device for tubular goods and more particularly to a method of installing multiple increased tensile strength variable diameter protective joints for use as so called blast joints to protect multiple consecutive segments of oil well production tubing. A protective joint is also disclosed.

In oil and gas wells the flow of gas, oil, fluids or combinations thereof from perforations in an underground pressure source often entrains solids including grains of sand. The resulting flow of gas or oil entrained solids often has a sufficient abrasive or cutting effect to cut holes into metal production tubing.

Through the use of logs and other methods well operators are able to locate the perforations in relation to a production tubing string, particularly since the perforations are generally man made. However, exact location of perforations in relation to the production string may be difficult due to the number of variables involved, including the length and weight of the production string, the configuration of the hole, and conditions downhole, such as temperature.

Through the years a number of so called blast joints have been developed with a view toward protecting production tubing. A number of patents disclose a variety of blast joints for tubulars. For example, Duesterberg, U.S. Pat. No. 2,925,097, discloses a covered tubular member for positioning in a well flow pipe. A tubular member is provided with a covering which is said to protect the tubular member from the cutting action of well fluids. The covering includes a coating of a resilient material which may be arranged on the outer surface of the tubular member in strip form. It is said that more than one joint of pipe can be provided with a coating to provide a suitable length. A sleeve formed of hard, brittle material covers the surface of the tubular member between two collars. The collars are adjacent to each end of the tubular member. The sleeve may be formed by a plurality of tubular members which are said to be in end to end interfitting or overlapping relation. Each of the plurality of tubular members forming the sleeve may be provided with recessed portions for interfitting and overlap. A second layer of resilient material is provided on substantially all of the outer surface of the sleeve to act as a shock absorber to protect the sleeve from breakage or damage as the tubular member and connected pipe sections are lowered into position in the well bore. In order to further protect the sleeve an outer shell of metal may be provided which extends between the collars and is secured to each collar by welding.

Ribb, U.S. Pat. No. 3,382,930, discloses a blast joint employing a ceramic material said to resist the eroding action of a fluid flowing against the joint. As disclosed therein, the blast joint includes a ceramic sleeve made up of a plurality of tubular ceramic members that are slipped on a tubing joint in end to end relationship. The ceramic members are held in position by annular collars of an impact resistant, non-brittle material, such as steel. They are provided with a pluraity of set screws which engage the tubing joint and hold the collars and the ceramic members between them against longitudinal movement on the joint. The annular collars are spaced from the ends of the tubing joint. A protector made up of an annular ring is located in a groove on the exterior of the blast joint and encircles it to prevent the blast joint from hanging upon obstructions in the well bore. Means are also provided as a cushion between ceramic members and means for holding the members spaced from the tubing string.

Bergstrom, U.S. Pat. No. 4,349,050, which has a common assignee with this invention, discloses a blast joint for subterranean wells. The blast joint is positioned around a section of production tubing. A plurality of rings are assembled on the section of production tubing in end face-to-face array. These rings fit snugly on the production tubing and are formed of a very hard and abrasive resistant material. The ends of the rings are lap finished and the assembly is maintained in compression by end collars and wave spring washers. When the blast joint is to extend the distance greater than a single section of tubing, two segments of production tubing are prepared by cutting the pin and box end from respective lengths of the production tubing. The resultant segments are joined in a flush pin and box joint.

Bergstrom, U.S. Pat. No. 4,028,796, which also has a common assignee with this invention, discloses a method of making a blast joint. The method involves utilizing a length of tubing with an internally threaded box joint at one end and an externally threaded pin joint on the other end so that the completed article may be fitted in a string of production tubing. The method involves using a high refractory sheathing resistant to abrasion and high temperature, subdivided into short length and constructed of a material such as tungsten carbide to be highly resistant to abrasion and high temperature. The sheathing is to be mounted on the production tubing in such a manner as to allow joining of the blast joint in a string of production tubing with the finished article having sufficient flexibility to permit handling and connecting. As indicated therein, a horizontal tubing section may be divided into two parts supported on crossbars or a rack and prepared and threaded for making up a flush joint. End retainer rings are passed over the corresponding sections of tubing toward their outer ends. Carbide rings are then passed over the tubing sections and extended to the respective retainer rings. Thereafter, sheath pipe sections are telescoped over the corresponding carbide rings of each of the tubing sections. The two sections of the sheathing are then secured together at the flush joint. The retainer rings and refractory rings are then slipped along the tube section to the flush joint between the tube sections such that the meeting edges of the protective sleeves may be joined by welding.

Prior methods and devices suffer from one or more of several difficulties or limitations including difficulties or limitations in handling, shipping, manufacturing, assembly, overall effectiveness, longevity, and reusability. Many of these problems are addressed by one or more of the inventions previously assigned to the same assignee as this invention. However, prior methods and devices still suffer from a limitation in not being able to directly and as effectively protect multiple tubulars connected in sequence where the tubulars include an increased diameter portion such as collars used with external non-upset tubing and upset tubing. For example, due to the method of assembly segments of increased diameter needing protection may be left uncovered. Alternatively, prior devices and methods have been unable to provide as effective a protective device covering a plurality of tubulars, such as oil well tubing, without impairing the tensile strength of the tubing string. These and other problems encountered with prior devices and methods are alleviated if not substantially eliminated by the present invention.

SUMMARY OF THE INVENTION

There is provided a method for installing multiple consecutive protective joints on tubulars. A multiple protective joint for use on tubulars is also disclosed.

The method for installing multiple protective joints on tubulars relates to tubulars where each tubular has a body portion and an increased diameter portion for coupling to another tubular. At least a part of the body and increased diameter portions of each tubular are to be included in a zone to be protected. A plurality of first generally cylindrical annular protective rings are coaxially installed over the body portion of a first tubular. A plurality of second generally cylindrical annular protective rings are also placed coaxially over the body portion of the first tubular. The second generally cylindrical annular protective rings are coaxially locatable along the increased diameter portion of each tubular and are supported on the body portion with at least one sleeve coaxially located below along the body portion of the first tubular. During transport or storage the first and second protective rings are held in place by retainers. During installation a second tubular is coupled to the first tubular. The second protective rings are then placed over the increased diameter portion of the second tubular while using at least one sleeve to limit movement of the second protective rings in their radial direction and facilitate movement of those rings over the increased diameter and body portions of the coupled tubular. There can thus be provided a series of multiple protective joints for use on consecutive tubulars having increased diameter portions for coupling to another tubular.

In order to obtain full advantage of the present method, the sleeve or sleeves should serve several purposes. First, the sleeves should support the second protective rings on the body portion during transport or storage of the second protective rings. Secondly, the sleeve or sleeves should facilitate movement of the second protective rings over the body and increased diameter portions during installation. Further, the sleeve or sleeves should permanently support and secure the second protective rings on the body portion between the increased diameter portion and a transition ring formation, which is coaxially selectably securable below the increased diameter portion of the first tubular and along the body portion of the first tubular. The interior sleeve or sleeves thus selectively support(s) the second protective rings and facilitate movement of those rings over the increased diameter and body portions of the coupled tubulars.

In a somewhat more detailed embodiment of the disclosure, there is provided a method for installing multiple consecutive protective joints on tubulars where each tubular has a body portion and an increased diameter portion for coupling to a like tubular and where at least a part of the body and increased diameter portions of each tubular are included in the zone to be protected. The method includes the steps of: (a) installing a first or upper subassembly along the body portion of a first tubular, the first subassembly having first protective rings coaxially located along the body portion and a first transition ring formation coaxially located below the increased diameter portion of the first tubular and along the body portion of the first tubular, the upper subassembly being selectively secured by an upper retainer; (b) installing a second subassembly on the body portion of the first tubular, the second subassembly having second protective rings coaxially located along the increased diameter portion of the first tubular and at least one sleeve coaxially located along the body portion of the first tubular and telescopically mated within those second protective rings, the second subassembly being selectively securable along the body portion of the first tubular; (c) coupling the first tubular with the second tubular having a second transition ring formation located below the increased diameter portion of the second tubular; (d) lowering the second protective rings over the increased diameter portion of the second tubular a sufficient distance to permit removal of any sleeves; (e) locating at least one sleeve on the body portion of the second tubular between the second transition ring formation and the increased diameter portion of the second tubular; (f) sliding the second protective rings over the increased diameter portion of the second tubular and any sleeves and into contact with the second transition ring formation to cover the increased diameter portion and any sleeve; and (g) lowering the first or upper subassembly into contact with the second protective rings to thereby form a protective joint covering the increased diameter portion of the second tubular and at least portions of the body portions of the first and second tubulars.

There is also provided a consecutive protective joint for tubulars, such as oil well production tubing, having a body portion with a first diameter and at least one coupling portion having an increased diameter portion. At least a part of both the first and increased diameter portions are included within a zone to be protected by the protective joint. The protective joint includes a plurality of first and second generally cylindrical annular protective rings such as carbide rings. The first protective rings are coaxially located along the body portion of the tubular. The second protective rings are coaxially located along the increased diameter portion of the upset. The first and second protective rings have flat and parallel faces and are sized and configured to accommodate bending movements along the longitudinal axis of the tubular. For example, the first and second protective rings may have flattened parallel faces, sufficient inside diameters and be engagable with like protective rings along a plane intersecting and normal to the inside longitudinal axis of the tubular to accommodate bending movements along the longitudinal axis of the tubular.

Two transition ring formations located on first and second tubulars respectively, are also provided. The transition ring formations each have first and second flat and parallel faces. Each transition ring formation also has an inside diameter and an outside diameter at its first face approximately equal to the inside and outside diameter, respectively, of the first protective rings. The inside diameter and outside diameter of each transition ring formation at its second face is approximately equal to the inside and outside diameter, respectively, of the second protective rings. The exterior surface of each transition ring formation is a generally continuous one extending from the first face to the second face of the transition ring formation. The interior surface of the transition ring formation may be configured to provide a space along the connection between the coupling portion or other zone of increased diameter and the body portion of the tubular sufficient to accommodate longitudinal movement of the protective joint with respect to the tubular.

At least one sleeve such as a permanent shim is also provided. The sleeve is colocatable along the body portion of the second tubular and is preferably placed between the upset diameter portion of the first tubular and the second transition ring formation on the second tubular. The sleeve is telescopically matable within the second protective rings and forms an extension of the zone of increased diameter from the upset diameter portion. The sleeve and upset diameter portion provide longitudinal support for the first and second transition ring formations and also support the second protective rings by limiting radial movement of the second protective rings.

There is also provided means for biasing, such means being coaxially located along some portion of the tubular for engagement with at least one of the protective rings. The biasing means in conjunction with retainers are configured to bias the first and second protective rings and the transition ring formation and so form a protective shield along the entire zone to be protected. The biasing means may include a plurality of wave springs and spacers.

The transition ring formations may take on a number of configurations. The interior surface of the transition ring formation may be a generally continuous surface. Alternatively, the interior surface of the transition ring formation may be a substantially discontinuous surface. Further, the transition ring formation may include one or more integrally mated units or rings. However, the transition ring formation is preferably made up of a plurality of rings of sufficient length along the axis of the tubular to accommodate bending movements in the tubular while remaining substantially sealingly engaged. The plurality of engagable rings preferably have flat and parallel faces normal to the longitudinal axis of the tubular.

Where the transition ring formation is made up of a number of rings, it may include a transition ring, a supporting ring, such as a weight distributing or impact distributing ring, and a compensating ring. Each of these rings have first and second flat and parallel faces and are coaxially disposed with respect to the interior of the longitudinal axis of the tubular. The transition ring is engagable on its first face with at least one of the first protective rings and has an inside diameter approximately equal to the inside diameter of the first protective rings and an outside diameter varying from the outside diameter of the first protective ring at its first face to an expanded outside diameter at its second face.

The supporting ring has an inside diameter approximately equal to the inside diameter of the transition ring and an outside diameter approximately equal to the expanded outside diameter of the transition ring at the second face of the transition ring. The first face of the supporting ring is engagable with the second face of the transition ring. The compensating ring has an outside diameter approximately equal to the outside diameter of the supporting ring and an expanded inside diameter. The expanded diameter of the compensating ring is sufficient to accommodate the increased diameter of the coupling.

The interior surface of the compensating ring is configured in relation to the exterior surface of the coupling and the body portion to provide sufficient spacing to accommodate longitudinal movement of the protective device with respect to the tubular. The length of the compensating ring may vary from the length of the second protective rings.

The protective rings and the rings making up the transition ring formation are preferably made of carbide or a material having characteristics similar to carbide.

BRIEF DESCRIPTION OF THE DRAWINGS

In the attached drawings:

FIG. 3 is an isolated three-dimensional view of a lower retainer for use in conjunction with one or more embodiments presently disclosed;

FIG. 4 is an isolated three-dimensional view showing two possible positions of a hinged or upper retainer for use in conjunction with one or more embodiments of the present disclosure;

FIG. 5 is a partial schematic view showing two posible positions of a lift plate in relation to one embodiment of the protective joints on tubulars described herein;

FIGS. 6 and 20 are schematic views of a protective joint located on a tubular as assemblies for transport with the tubular;

FIGS. 7-10, 12-13 and 16-17 are schematic views showing various steps for installing multiple consecutive protective joints on tubulars according to the disclosure herein;

FIGS. 11 and 19 are partial isolated views showing the use of a shim as a sleeve in accordance with two embodiments of the method disclosed herein;

There now follows a detailed description of several embodiments of the present invention and disclosure in conjunction with the foregoing drawings. This detailed description is to be taken by way of illustration rather than limitation.

DETAILED DESCRIPTION

Figure 1:
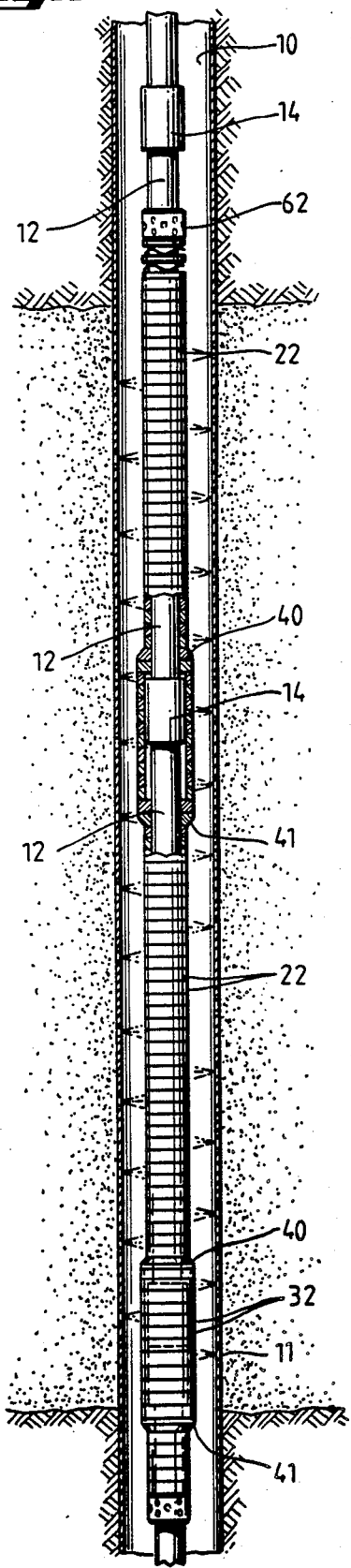
FIG. 1 is a schematic view of one of the presently disclosed embodiments shown in a downhole environment in which it may be used.

FIG. 1 shows a schematic view of one embodiment of the present invention in a well 10 having perforations 11 through which gas or oil entrained particles are escaping and impacting portions of the tubular string made up of tubing joints 12 and couplings 14.

The couplings 14 have increased diameters and are otherwise constructed to provide sufficient tensile strength to support the production string. Although couplings, such as flush joints, having no increase in diameter are sometimes employed, this can be disadvantageous since such couplings generally have only about 50% of the strength of couplings having increased diameters.

As can be seen from FIG. 1, the perforations or openings 11 can be located by either the tubing joint 12 or the coupling 14 or both, thus placing both within a zone to be protected on the tubular string. Exact placement of a tubing string to avoid impact of specific portions of the string is not always possible. Areas of possible impact can also be quite extensive. There is thus a need for an effective method for protecting a multiple tubular assembly with each tubular having a body portion, such as tubing joint 12, and at least one coupling portion, such as coupling 14, with an increased outside diameter.

Referring generally to FIGS. 6–13 and 20, there is provided a method for installing consecutive multiple protective joints on tubulars using first protective rings, such as tubing body rings 22, second protective rings, such as body rings 32, and a permanent sleeve, such as permanent shim 102. As will be apparent to one skilled in the art from reading this disclosure, the permanent sleeve such as permanent shim 102 in conjunction with a temporary or shipping sleeve, such as temporary shim 100, serves several purposes. More particularly, temporary shim 100 and permanent shim 102 support body rings 32 during transport of a protective joint assembly. Temporary shim 100 and permanent shim 102 also serve to facilitate movement of the body rings 32 over the body portion 12 of the tubular and the increased diameter portion of the tubular such as coupling 14. Permanent shim 102 further provides permanent support for and helps to secure body rings 32 between and along coupling 14 and first and second transition ring formations 40 and 41.

To facilitate assembly and use temporary shim 100 is shorter in length than permanent shim 102. For example, temporary shim 100 might be about 6 inches while permanent shim 102 is about 24 inches.

As shown in FIG. 20 the permanent sleeve such as permanent shim 102 may preferably be made up of a plurality of cylindrical rings. As would be appreciated by one skilled in the art having read this disclosure, the use of a number of sleeve segments can facilitate adjustment of sleeve length. This can be particularly beneficial in facilitating the relocation of the permanent sleeve such as permanent shim 102 on the lower segment of tubing, since spacing can vary, as for example due to the removal of retainers such as lower retainer ring or clamp 110 and upper retainer ring or clamp 102. Thus, the permanent sleeve may preferably be made up of a number of cylindrical segments.

As shown in FIGS. 6 and 20, there is provided a transportable assembly with two transportable subassemblies held in place on tubing body 12 by a first or lower retainer, such as lower retainer ring or clamp 110, and a second or upper retainer, such as upper retainer ring or clamp 120, respectively. As would be known to one skilled in the art having the benefit of this disclosure, the first and second retainers can take on a number of configurations. As shown in FIG. 3, the lower retainer, such as lower retainer ring or clamp 110, may take on a generally cylindrical configuration utilizing set screws 112 to secure the lower retainer ring or clamp 110 to tubing 12. As shown in FIG. 4, the upper retainer such as upper retainer ring or clamp 120 may have a cylindrical hinged configuration to facilitate removal from tubing 12 without the need for sliding the retainer to the end of the tubing. Thus, as shown in FIG. 4, upper retainer ring or clamp 120 is provided with upper retainer ring or clamp hinges 122 which allow the upper retainer ring or clamp 120 to be opened and so removed directly from the tubing 12. Upper retainer ring or clamp screw 124 is used to secure the upper retainer ring or clamp 120. Holes 126 are also provided for set screws to secure the upper retainer ring or clamp to the tubing.

Referring back to FIGS. 6 and 20, the lower retainer such as lower retainer ring or clamp 110 supports the first subassembly made up of shipping shim 100 and permanent shim 102 which are mated within coupling body rings 32. Upper retainer ring or clamp 120 in turn serves to support the second subassembly including first or upper transition ring formation 40 and tubing body rings 22.

As shown in FIG. 6, the tubing body rings 22 may be held in place by a third retainer such as collar 62 which is held in place on tubing 12 by Allen head set screws 66. A combination of wave springs 52 and spacers 54 are also provided to facilitate transport and installation of the protective joint assembly shown in FIG. 6. The wave springs 52 and spacers 54 in conjunction with collar 62 serve to form a biasing means. As discussed below, the third retainer along with the wave springs and spacers generally form part of the transportable assembly where the underlying tubular is to be the last in a string of tubulars to be protected.

As shown in FIG. 6, thread protectors 15 and 17 are also provided to protect the ends of the tubular forming part of the transportable assembly as would be known to one skilled in the art having the benefit of this disclosure.

Any biasing means used may take on any one of a number of configurations as would be known to one skilled in the art having the benefit of this disclosure. However, as shown in the drawings, the biasing means is believed to preferably include a plurality of alternating wave springs 52 and spacers 54. The use of wave springs 52 encircling the tubing joint 12 and disposed between the array of tubing body rings 22 and the collar 62 tends to minimize damage to the protective joint during lowering into a well. More particularly, as discussed in U.S. Pat. No. 4,211,440, a difficulty was encountered where a blast joint comprising a plurality of carbide rings and of considerable length was picked up from the horizontal position by a crane prior to being lowered into the well for attachment to a tubing string. When the protective joint was picked up, damage in the form of cracking or fracture of one or more of the tubular body rings 22 would occasionally occur. It is believed that the bending of the tubing string with the rings held against each other by unyielding retainers, such as clamping rings, compressed the rings on the concave side of the string being lifted from the floor tending to chip, crack or break one or more of the rings or the edges thereof. The tubular body rings were sometimes chipped in compression on the concave side because the supporting production is in some degree elastic and with the relatively heavy inelastic rings being held tightly endwise between the end clamping rings and being inflexible, they were subjected to high localized compressive stresses being forced together on the concave side of the bend and tending to be separated from each other on the convex side. While the production tube could stretch and the rings could separate on the convex side to some degree, there is no adequate freedom for shortening of the concave side because the rings occupied the available space and are literally incompressible.

The unbalanced stress of compression is initiated on the upper side of the uppermost tubular body rings when the lifting of that end begins during installation of a tubular into a well. By providing the wave springs at that location the sharp bending stresses on the upper end of the string are relieved by the yielding of the adjacent wave spring. The danger of cracking or chipping is thus believed to be greatly reduced or eliminated in conjunction with the protective joint.

The biasing means may also serve to facilitate the handling of stress downhole.

Referring now to FIG. 7, the transportable assembly shown in FIG. 6 is lowered into position above another tubular held in position in the hole 10 by wedges or slips 140, which are not necessarily shown to size. As indicated in FIGS. 7 and 8, the transportable assembly including the tubular is lowered and the joint between coupling 14 of the lower tubular and the male end of body portion 12 of the upper tubular is made up. Slips 140 may then be removed to allow movement of the tubulars downhole.

Next, as shown in FIG. 8, the lower retainer ring or clamp 110 is removed while a temporary support such as lift plate 130 is used to support coupling body rings 32 as well as temporary shim 100 and permanent shim 102. Referring in more detail to FIG. 5, lift plate 130 is equipped with a moveable plate portion 132 which may be selectively secured to prevent movement of the coupling body rings 32 in relation to the tubing, all as would be known to one skilled in the art having the benefit of this disclosure. Thus, as shown in FIG. 9, lift plate 130 moveably supports coupling rings 32 and allows them to slide down over coupling 14 exposing permanent shim 102. Permanent shim 102 may then be removed from tubing body 12 and transferred to a point on the next lower tubing body 12 between coupling 14 and lower or second transition ring formation 41 as shown in FIG. 10.

Although permanent shim 102 may take on a variety of configurations as would be known to one skilled in the art having the benefit of this disclosure, it is preferably designed to permit direct removal from the tubing body 12 with minimal or no sliding of the permanent shim 102. To this end, the permanent shim 102 may preferably be constructed of two separate semicircular or semicylindrical components 103 and 104 which are unconnected except by screws or other fastening elements as indicated generally in FIG. 19. The semicircular components may thus be readily clamped in place on the tubular or removed from the tubular with minimal or no longitudinal movement of the permanent shim 102 as indicated in FIG. 19. Alternatively, as shown in FIG. 11, the permanent shim 102 may be provided with a hinge 106 which allows opening of the permanent shim 102 upon loosening of clamp 104. As indicated in FIG. 11, the permanent shim may thus be in a closed position indicated generally at 108 and securely mated to the tubing 12. Alternatively, upon the opening of clamp 104 the permanent shim may be opened to the open position indicated generally at 109 and removed directly from the tubing 12 for transfer to another place on the same or another tubular.

As previously indicated, permanent shim 102 also preferably comprises a number of segments to facilitate relocation on another tubular. The use of multiple segments to make up permanent shim 102 can also allow the use of the same segments even though retainers or other elements of the protective joint may vary in length or configuration.

Once permanent shim 102 has been relocated between coupling 14 and lower transition ring formation 41, as shown in FIG. 10 coupling body rings 32 may then be lowered into place over the permanent sleeve 102 into contact with the lower transition ring formation 41 by means of lift plate 130. This in turn exposes temporary or shipping shim 100 which is configured for easy removal in much the same fashion as permanent shim 102. As would be known to one skilled in the art having the benefit of this disclosure, the temporary or shipping shim may take on a variety of configurations. As shown in the drawings, the shipping shim 100 is shown with a double clamp assembly analogous to that shown in FIG. 11 for permanent shim 102. It is believed that in practice a single clamp assembly designed in much the same fashion as the permanent shim 102 will often be sufficient.

Once the permanent shim 102 and coupling body rings 32 have been positioned, the upper retainer ring or clamp 120 can be replaced with lift plate 130 in much the same fashion as with lower retainer ring or clamp 110. As shown in FIG. 12, the second transportable subassembly including upper transition ring formation 40 and tubing body rings 22 may be lowered into contact with the coupling body rings 32 and the coupling 14 such that the first transition ring formation 40 engages coupling rings 32.

The transportable assembly shown in FIG. 6 utilizes a retainer such as collar 62. However, transportable assemblies, such as shown in the lower part of FIG. 7 and in FIG. 20, used in intermediate positions in the series of consecutive protective joints preferably do not employ a retainer or biasing means. Rather, as shown generally in FIG. 20, the second or upper transportable assembly extends to coupling 14 with the lower transition ring formation 41 engaging coupling 14 to secure the subassembly during transport. Thus, once tubing body rings 22 and so the lower transition ring formation 41 are lowered on the tubing body 12, the lower transition ring formation 41 will be ready to engage the permanent shim 102 and coupling body rings 32 as indicated for the tubular located in hole 10 in FIGS. 7 and 8. Biasing means are believed unnecessary as an intermediate member of the protective joint is brought into position above the previous tubular since there generally exists sufficient play in the tubing body rings 22 and the second transition ring formation 41 to avoid problems with bending or cracking in the rings. Thus, as would be known to one skilled in the art having the benefit of this disclosure, another transportable assembly may next be brought into place to extend the protective joint over additional tubing without the use of a third retainer such as retainer 62.

Alternatively, but less preferably, a series of tubing body rings 22 and a lower transition ring formation 41 may be located above retainer 62 and further secured with an additional retainer where the transportable assembly is to serve as one of a consecutive number of joints to be within the zone to be protected. In such a case the additional retainer should be removable with a minimum of sliding or longitudinal motion in much the same fashion as permanent shim 102. Removal of the additional retainer will thus leave the lower transition ring formation 41 ready to engage the permanent shim 102 and coupling body rings 32 as indicated for the tubular located in hole 10 in FIGS. 7 and 8. Further, in such a case collar 62 should likewise be removable to minimize the area unprotected by the protective joint. This alternative is less preferable since it exposes portions of the tubular at the wave springs and involves additional steps in assembly as well as the use of additional parts such as a retainer which is readily removable.

Figure 14:
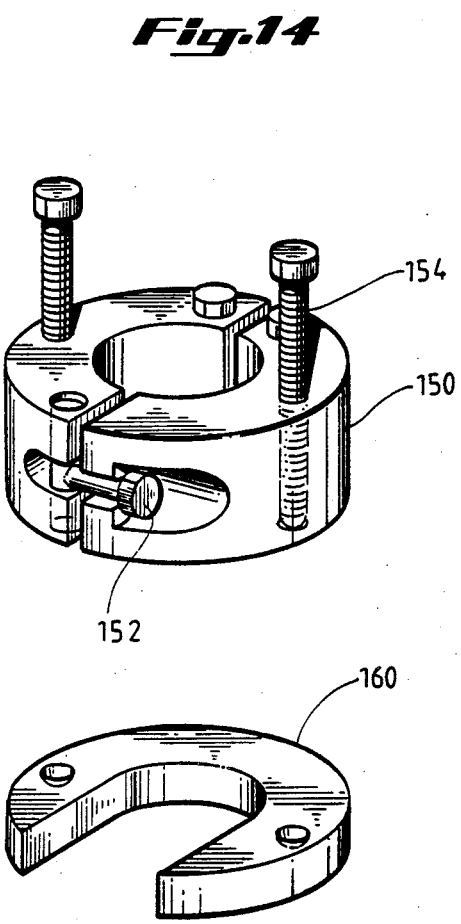
FIG. 14 is an isolated three-dimensional view of a compression clamp for use in conjunction with one embodiment of the present disclosure.
Figure 15:
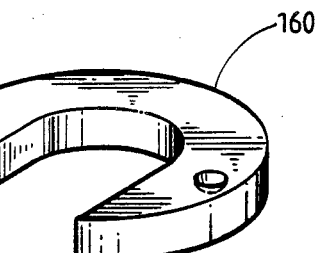
FIG. 15 is an isolated three-dimensional view of a pressure plate for use in conjunction with the compression clamp.

Generally, a third retainer will be put in place on the last member of the consecutive protective joint where the next coupling 14 is not in the zone to be protected. For example, as shown in FIG. 13 retainer 62 may be positioned with springs 52 largely uncompressed. Proper compression may then be placed on springs 52 by retainer 62 using compression clamp 150 and pressure plate 160. As shown in FIG. 14, compression clamp 150 is made up of an annular cylindrical assembly which may be secured to the tubing 12 by means of screws 152. Screws 154 are also provided with the compression clamp 150 for mating with pressure plate 160, which is shown in FIG. 15. As indicated in FIGS. 16 and 17, collar 62 may be loosened and wave springs 52 compressed by means of turning screws 154 of compression clamp 150. The wave springs are preferably compressed until they are flat. Once compressed, the Allen head screws on collar 62 are then tightened and compression clamp 150 and pressure plate 160 removed. Although there are preferably no protective rings located above the upper retainer such as collar 62, any protective rings located above the upper retainer such as collar 62 may be supported by a moveable support such as lift plate 130 during the procedure for compressing the biasing means as would be known to one skilled in the art having the benefit of this disclosure.

Figure 18:
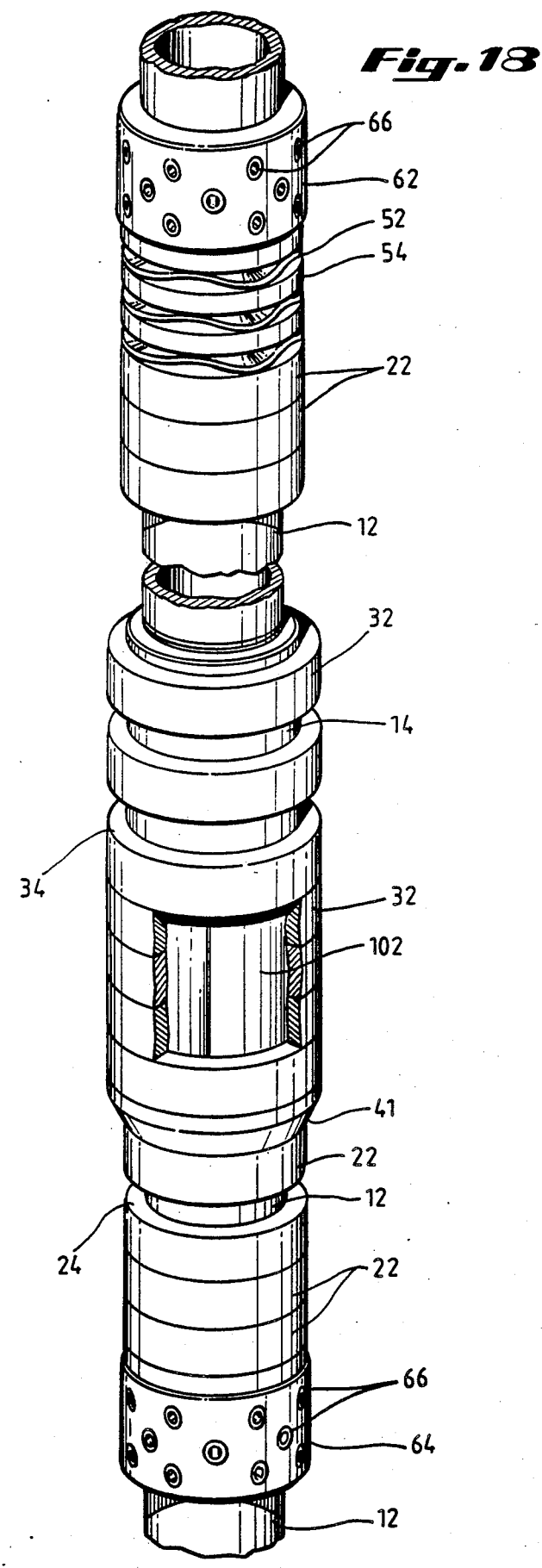
FIG. 18 is a partially exploded schematic view of one embodiment of a protective device which may be installed using the presently disclosed method.

As indicated in FIG. 18, the first tubular member forming part of the protected zone or joint may also be equipped with a low end retainer such as collar 64 similar to collar 62. The low end retainer may form part of a transportable assembly. Alternatively, it may be slipped over the male portion of the tubular before tubing body 12 is mated with coupling 14 of the next lowest tubular in the string which is outside the zone to be protected.

It can thus be seen that there is provided a method for protecting consecutive multiple variable diameter tubulars in a string. There is also provided a protective joint for consecutive multiple tubulars having increased diameter portions.

Referring generally to FIGS. 1, 2, 13, 17 and 18, there is also provided a protective joint for a tubular assembly having a body portion, such as a tubing joint 12, and at least one coupling portion, such as coupling 14, with an increased outside diameter. Generally, the protective joint includes a plurality of first generally cylindrical annular protective rings, such as tubing body rings 22, and a plurality of second generally cylindrical annular protective rings, such as coupling body rings 32. The tubing body rings 22 are coaxially locatable along the tubing joint 12 while the coupling body rings 32 are coaxially locatable along the coupling 14 and a sleeve such as permanent shim 102. The tubing body rings 22 and the coupling body rings 32 have flat and parallel faces normal to the longitudinal axis of the tubular and are sealingly engagable with like rings.

Figure 2:
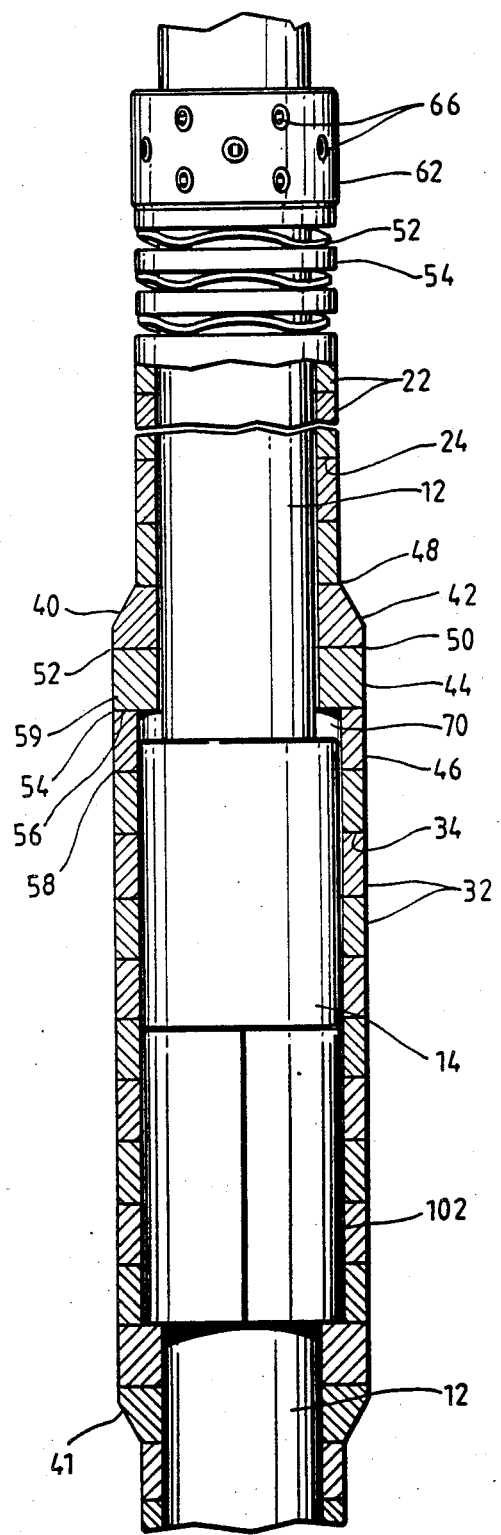
FIG. 2 is a cutaway and partial schematic view of a protective device shown generally in FIG. 1 and in conjunction with non-upset threaded and coupled joints.

There are further provided two transition ring formations indicated generally at 40 and 41. The transition ring formations have two flat and parallel faces which are sealingly engagable with tubing body rings 22 and coupling body rings 32, respectively. As shown in FIG. 2, the transition ring formations are preferably configured to provide a space, such as space 70, along the connection between the coupling portion, such as coupling 14, and the body portion of the tubular, such as tubing joint 12. The space is sufficient to accommodate relative longitudinal movement of the tubular assembly with respect to the protective device.

As previously indicated, biasing means such as wave springs 52 and spacers 54, are also provided and are engagable at one end with at least one of the protective rings such as tubing body rings 22. At the other end the biasing means is engagable with a retainer such as collar 62. The biasing means is engagable at one end with a retainer and at the other end with at least one of the protective rings to thereby bias the tubing body rings 22, the coupling body rings 32 and the transition ring formations to thereby form a protective shield along a zone of the tubular encompassing varying outside diameters. There is thus provided a protective joint which may effectively protect a selected portion of a tubular assembly having segments of varying outside diameter while still accommodating bending movements along the longitudinal axis of the tubular as well as longitudinal movement of the tubular with respect to the protective joint caused by changes in temperature, movement of the string, the weight of the tubing string and other causes. This in turn facilitates location of the protective joint on a tubing string in relation to any streams of gas or oil entrained particles or the like, such as might come from perforations 11.

Permanent shim 102 supports a portion of coupling body rings 32 and provides additional flexibility over the length of the increased diameter portion since permanent shim 102 is separate from coupling 14. Permanent shim 102 preferably abuts coupling 14. However, permanent shim 102 may be spaced somewhat from coupling 14 provided that the distance between the two is less than the axial length of the coupling body rings 32 so that the coupling body rings 32 are adequately supported to form a uniform protective joint.

The transition ring formations may take on a variety of configurations depending on the application and the type of tubular assembly or connection employed. For example, referring to the embodiment shown in FIG. 2, the transition ring formation may preferably include a plurality of rings including a transition ring, such as ring 42, a weight distribution or impact distribution ring, such as ring 44, and a compensating ring, such as ring 46.

The transition ring 42 has a first face 48 and a second face 50 and is coaxially disposed with respect to the inside longitudinal axis of the tubing joint 12. The first face 48 and the second face 50 of the transition ring 42 as well as the first face 52 and the second face 54 of the weight distribution or impact distribution ring 44 and the first face 56 and the second face 58 of the compensating ring 46 are parallel and flat in a plane substantially normal to the longitudinal axis of the tubular. As the tubing body faces 24 of the tubing body rings 22 and the coupling body faces 34 of the coupling body rings 32 are likewise substantially parallel and flat along a plane normal to the longitudinal axis of the tubing joint 12, the various rings may be sealingly engaged with each other, yet respond to translational forces as might be caused by bending or flexing of a tubing string.

The transition ring 42 has an inside diameter approximately equal to the inside diameter of the tubing body rings 22 and an outside diameter varying from the outside diameter of the tubing ring 22 at the transition ring's first face 48 to an expanded outside diameter at the transition ring's second face 50. The variation in the outside diameter of the transition ring 42 from its first face 48 to its second face 50 preferably results in a smooth and continuous transition. However, the complete change in outside diameter may take place prior to the second face 50 of the transition ring 42.

The weight distribution or impact distribution ring 44 is also coaxially located along the tubing joint 12 prior to its juncture with the coupling 14. The weight distribution ring 46 has an outside diameter equal to the increased outside diameter of the transition ring 42 at its second face 50 and an inside diameter equal to that of the transition ring 42. It can thus be seen that the transition ring 42 and the weight distribution ring 46 provide a zone of uniform interior cross section and diameter with an increase in outside diameter along the longitudinal axis of the tubular.

The walls 59 of the weight distribution or impact distribution ring 44 should provide sufficient support to minimize any damage to the transition ring 42 when the tubing joint and coupling are moved in and out of confined areas.

The compensating ring such as ring 46 is only partially coaxially located along the coupling 14. Although the compensating ring 46 has an outside diameter equal to the outside diameter of the coupling body rings 32 and the weight distribution ring 44, it has an inside diameter equal to the inside diameter of the coupling body rings 32 and larger than the inside diameter of the weight distribution ring 44. This change in inside diameter of the transition ring formation between the inside diameter of the weight distribution ring 44 and the inside diameter of the compensating ring 46 coupled with the overlap of the compensating ring 46 beyond the end of the juncture of the coupling 14 and tubing joint 12 provides a space 70.

The dimensions of the compensating ring 46 are such as to allow the space 70 to accommodate expected longitudinal movement of the coupling 14 in tubing joint 12 with respect to the protective joint when the tubular assembly being protected becomes part of a tubing string. Such longitudinal movements may occur as a result of the weight of the tubing string, changes in temperature or changes in direction of the tubing string at or near the location of the protective joint. By way of example and not by way of limitation, the space 70 formed by the inside wall of the compensating ring 46, a portion of the compensating ring 46, a portion of the outer surface of the tubing joint 12 and the coupling 14, may have a length along the longitudinal axis of the tubular assembly of at least one-fourth of an inch but preferably of one-half of an inch.

Depending upon the configuration of the transition ring formation and the coupling, if any, the compensating ring, such as ring 46, may simply consist of another coupling body ring 32. However, it is believed important to provide a sufficient space, such as space 70, to accommodate the expected longitudinal movement of the tubular with respect to the protective joint. Although not always necessary, this can be particularly important since use of the subject method and apparatus allows extension of a continuous protective joint over a number of consecutive tubulars. Also, a similar or alternate space may be provided near permanent shim 102 as would be known to one skilled in the art having the benefit of this disclosure.

Although it is believed that the protective joint can be most easily manufactured and employed with a tubular assembly such as the non-upset threaded and coupled joint, it is believed that a protective joint in accordance with the disclosure will also be useful with other tubular assemblies. For example, variations of the protective joint may be used with an API external upset coupling. The transition ring formation may comprise one integral ring or a plurality of integrally mated cone shaped rings. For example, the transition ring formation may include a number of cone shaped rings having areas of expanding inside or outside diameter or both to accommodate an API integral joint.

It is presently believed that if the transition ring formation comprises carbide rings then the rings should preferably be no more than about one to one and one-half inches in length with respect to the longitudinal axis of the tubular assembly. Thus, it is believed that if the transition rings are approximately more than one inch in length than a plurality of rings should be employed. Further, it is believed preferable to maintain a smooth transition along the interior surface of the protective rings, such as is the case with cone shaped rings, to avoid binding or directly impacting the upset portion of the tubular assembly such as the upset portion of an integral joint.

Although it is presently believed preferable to employ a weight distribution or impact distribution ring, this may not always be necessary for some applications. This embodiment may be particularly useful where the transition ring is equipped along its length with an additional segment of increased thickness and the tubular assembly will only be subject to relatively minimal stresses downhole.

The protective rings employed are preferably made of carbide or a material having characteristics similar to carbide. More particularly, the rings making up the protective device are preferably made up of cemented tungsten carbide produced in the form of rings which may be placed shoulder-to-shoulder axially in line along the length of the tubular assembly to be protected. The cemented tungsten carbide has provided resistance of great strength and hardness and non-corrodible character which is capable of enduring the impact or blast of liquids or gases bearing entrained sand or other abrasive materials from underground high pressure sources. Although such a material is relatively brittle, subject to internal stresses and frangible, a protective joint in accordance with the disclosure provides effective protection for the tubing joint and should also provide effective protection along consecutive zones of increased diameter, particularly where the axial length of any of the rings is limited.

The first and second protective rings, such as tubing body rings 22 and coupling body rings 32, may thus consist of cemented tungsten carbide produced in the form of short cylindrical rings with flat and parallel faces which may be held in shoulder-to-shoulder contact with each other. The transition formation may likewise be made of cemented tungsten carbide. The protective rings thus provide effective protection over consecutive tubulars having zones of increased diameter while being able to accommodate bending movements along the longitudinal axis of the tubular.

As would be known to one skilled in the art having the benefit of this disclosure, the end retainers may take on a number of configurations and may be used in a variety of positions. For example, as shown in FIG. 18, the retainers may include collars such as collars 62 and 64 located at either end of a protective joint covering a series of tubulars having increased diameter portions. The collars 62 and 64 are of an internal diameter of a size sufficient to fit snugly on the external cylindrical surface of the tubing joint 12. A series of Allen head set screws 66 are seated in threaded holes in the collars 62 and 64 and are designed to grip the tubing joint 12 when the screws are tightened or release the tubing joint 12 when the screws are loosened. Although the collars 62 and 64 are believed to be preferably of an internal diameter less than that of the coupling 14, it may be feasible in some instances to employ collars on a segment of the coupling 14.

The following example is provided by way of further illustration rather than limitation.

EXAMPLE

The following example is provided with reference to the embodiment shown generally in FIG. 2. Where the tubular assembly includes a non-upset threaded and coupled joint for 2⅜″ tubing the following dimensions in inches are generally believed to be preferable:

| Measurement in Inches | |
|---|---|
| Inside diameter of the tubing joint 12 | 1.995[1] |
| Outside diameter of the tubing joint 12 | 2.375 |
| Inside diameter of the coupling 14 | 1.995 |
| Outside diameter of the coupling 14 | 2.875 |
| Inside diameter of the tubing body rings 22 | 2.420 |
| Thickness of the tubing body rings 22 | 0.250 |
| Inside diameter of the coupling body rings 32 | 2.930 |
| Thickness of the coupling body rings 32 | 0.250 |
| Length of collar 62 | 2.750 |
| Inside diameter of the transition ring 42 | 2.420 |
| Minimum thickness of the transition ring 42 at its first face 48 | 0.250 |
| Maximum thickness of the transition ring 42 at its second face 50 | 0.540 |
| Maximum diameter of the transition ring 42 | 3.500 |
| Outside diameter of the weight distribution or impact distribution ring 44 | 3.500 |
| Inside diameter of the impact distribution ring 44 | 2.420 |
| Inside diameter of compensating ring 46 | 2.930 |
| Wall thickness of compensating ring 46 | 0.250 |
| Length of coupling body rings 32 | 1.000 |
| Length of tubing body rings 22 | 1.000 |
| Length of each of two compensating rings 46 | 1.250 |
| Length of space 70 from the second face 54 of weight distribution ring 44 to the juncture of tubing joint 12 and coupling 14 | 0.500 |
| Difference between outside surface of coupling 14 and inside surface of coupling body rings 32 | 0.0275 |
| Length of coupling 14 | 6.5 |
| Number of coupling body rings 32 | 5 |
| Inside diameter of collar 62 | 2.420 |
| Number of wave springs 52 | 20[2] |
| Number of spacers 54 | 5[3] |
| Length of permanent shim 102 | 24 |
| Length of temporary shim 100 | 6 |

[1]Normal drift.
[2]Can vary with length of blast joint and temperature.
[3]There are preferably four wave springs for each spacer.

As will be appreciated by one skilled in the art having the benefit of this disclosure a number of modifications may be made to the foregoing method and apparatus within the spirit of the present invention. For example, the protective joint may be used on a fairly wide range of tubing.

Additionally, the portion of a tubular assembly covered by the protective joint may be varied considerably. Further, any two of the rings may be integrally mated to each other either as a forged single piece or by welding. For example, the transition ring and the supporting ring may be formed into one integral piece. However, care should be taken in this regard to avoid overextending the length of the rings along the tubular's longitudinal axis for the reasons discussed above.

Also, the temporary sleeve such as temporary shim 100 may comprise a plurality of cylindrical segments.

Further modifications and alternative embodiments of the apparatus and method disclosed herein will be apparent to those skilled in the art in view of this description. Accordingly, this description is to be construed as illustrative only and is for the purpose of teaching those skilled in the art the manner of carrying out the invention. It is to be understood that the forms of the invention herewith shown and described will be taken as the presently preferred embodiments. Various changes may be made in size, shape and arrangement of parts. For example, equivalent elements or materials may be substituted for those illustrated and described herein, parts may be reversed and certain features of the invention may be utilized independently of the use of other features, all of which would be apparent to one skilled in the art after having the benefit of this disclosure.

What is claimed is:

1. A method for installing multiple protective joints on tubulars, each tubular having a body portion and an increased diameter portion for coupling to another tubular, at least a part of the body and increased diameter portions of each tubular to be included in a zone to be protected, said method comprising:

installing a plurality of first generally cylindrical annular protective rings coaxially over the body portion of a first tubular;

placing a plurality of second generally cylindrical annular protective rings coaxially locatable along the increased diameter portion of each tubular over the body portion of the first tubular while supporting the second protective rings with at least one sleeve coaxially located along the body portion of the first tubular;

coupling a second tubular to the first tubular to form coupled tubulars; and placing the second protective rings over the increased diameter portion of the second tubular while using at least one sleeve to limit movement of the second protective rings in their radial direction and facilitate movement of those rings over the increased diameter and body portions of the coupled tubular.

2. A method for installing multiple protective joints on tubulars, each tubular having a body portion and an increased diameter portion for coupling to a like tubular, at least a part of the body and increased diameter portions of each tubular to be included in a zone to be protected, said method comprising:

installing a first subassembly along the body portion of a first tubular, said first subassembly comprising a plurality of first protective rings coaxially located along the body portion and a first transition ring formation, said first subassembly being selectively securable below the increased diameter portion of the first tubular and along the body portion of the first tubular;

installing a second subassembly on the body portion of the first tubular below the first subassembly, said second subassembly comprising second protective rings coaxially located along the increased diameter portion of the first tubular and at least one sleeve coaxially located along the body portion of the first tubular and telescopically mated within the protective rings, said second subassembly being selectively securable along the body portion of the first tubular;

coupling the first tubular with a second tubular having a second transition ring formation located below the increased diameter portion of the second tubular;

lowering the second protective rings over the increased diameter portion of the second tubular a sufficient distance to permit removal of any sleeves;

relocating at least one sleeve on the body portion of the second tubular between the second transition ring formation and the increased diameter portion of the second tubular;

sliding the second protective rings over the increased diameter portion of the second tubular and any sleeve and into contact with the second transition ring formation to cover said increased diameter portion and any sleeve; and lowering the first subassembly into contact with the protective rings to thereby form a protective joint covering the increased diameter portion of the second tubular and at least portions of the body portions of the first and second tubulars.

3. A method for installing multiple protective joints for tubulars, each tubular having a body portion and an increased diameter portion for coupling to a like tubular, at least a part of the body and increased diameter portions of each tubular to be included in a zone to be protected, said method comprising:

installing a first subassembly sequentially comprising biasing means, first protective rings coaxially locatable along the body portion of a first tubular, and a first transition ring formation along with a first retainer along the body portion of the first tubular below the upset diameter portion of the first tubular such that the first retainer serves to hold the first subassembly in place on the first tubular;

installing a second subassembly below the first subassembly along the body portion of the first tubular, said second subassembly comprising second protective rings coaxially locatable along the increased diameter portion of the first tubular, and temporary and permanent sleeves coaxially located along the body portion and within the second protective rings, said second subassembly being installed such that the permanent sleeve and the second protective rings abut the first retainer and the temporary sleeve abuts the permanent sleeve;

using a second retainer to secure the second subassembly to the body portion of the first tubular to form a transportable assembly comprising the first and second subassemblies;

placing a removable support under the second subassembly while supporting the first tubular above a second tubular, said second tubular having first protective rings and a second transition ring formation located below the increased diameter portion of the second tubular;

removing the second retainer from the first tubular;

coupling the first and second tubulars;

lowering the second protective rings of the second subassembly over the increased diameter portion of the second tubular a sufficient distance to permit removal of the permanent sleeve;

relocating the permanent sleeve on the body portion of the second tubular between the second transition ring formation and the increased diameter portion of the second tubular;

removing the temporary sleeve from the first tubular;

sliding the second protective rings over the increased diameter portion of the second tubular and the permanent sleeve and into contact with the second transition ring formation; and removing the first retainer and lowering the first subassembly into contact with the second protective rings to thereby form a protective joint covering the increased diameter portion of the second tubular and at least portions of the body portions of the first and second tubulars.

4. A method according to claim 3 further comprising the step of compressing a biasing means coaxially located on the tubular to more fully secure the protective joint.

5. A method according to claim 4 wherein the first subassembly further comprises a permanent retainer coaxially located above the biasing means and wherein the method further comprises the step of compressing the biasing means by coaxially locating a pressure plate and a compression clamp above the permanent retainer, securing the permanent retainer to the first tubular and thereafter removing the pressure plate and compression clamp.

6. An apparatus for protecting consecutive multiple protective joints on tubulars, each tubular having a body portion and an increased diameter portion for coupling to another tubular, at least a part of the body and increased diameter portions of each tubular to be included in a zone to be protected, said apparatus comprising:

a plurality of protective members including:

a sleeve coaxially located along the body portion of the second tubular, said sleeve forming an extension of the increased diameter portion coaxially located along the body portion of the first tubular;

a plurality of first generally cylindrical annular protective rings coaxially located over the body portion of the first and second tubulars;

a plurality of second generally cylindrical annular protective rings coaxially located over the increased diameter portion of the first tubular and the sleeve; and first and second transition ring formations, each having first and second faces with an inside and outside diameter at its first face approximately equal to the inside and outside diameter, respectively, of the first protective rings and an outside diameter at its second face approximately equal to the outside diameter of the second protective rings, the first transition ring being coaxially located on the first tubular between the first and second protective rings and near the increased diameter portion and the second transition ring formation being coaxially located on the second tubular between the first and second protective rings and near the sleeve; and biasing means coaxially located along one of the tubulars and engagable at one end with a retainer coaxially located on the tubular and at the other end with at least one of the protective members to thereby sealingly engage the protective members to form a protective joint over the tubulars.

7. A protective joint for multiple consecutive tubulars having a body portion with a first diameter and at least one coupling portion connected to the body portion and having an increased diameter portion, at least a part of both the first and increased diameter portions being included within a zone to be protected by the protective joint, said protective joint comprising:

a permanent sleeve coaxially located along the body portion of each tubular, said sleeve forming an extension of and being located adjacent to the increased diameter portion;

a plurality of first and second generally cylindrical annular protective rings, said first protective rings being coaxially located along the body portion of the tubular and said second protective rings being coaxially located along the increased diameter portion of the coupling portion of the sleeve, said first and second protective rings having flat and parallel faces, having sufficient inside diameters and being engagable with like protective rings along a plane intersecting the inside longitudinal axis of the tubular to accommodate bending movements along the longitudinal axis of tubular;

first and second transition ring formations located on each side of an increased diameter portion and its adjacent sleeve and having first and second flat and parallel faces, each transition ring formation having an inside diameter and outside diameter at its first face approximately equal to the inside and outside diameter, respectively, of the first protective rings and each transition ring formation having an inside diameter and outside diameter at its second face approximately equal to the inside and outside diameter, respectively, of the second protective rings, the exterior surface of each transition ring formation comprising a generally continuous surface from the first face to the second face of the transition ring formation and the interior surface of at least one of said transition ring formations being configured to provide a space along the connection between the coupling portion and the body portion of the tubular sufficient to accommodate longitudinal movement of the protective device with respect to the tubular; and biasing means coaxially located along at least some portion of the consecutive tubulars, said biasing means being engagable at one end with a retainer locatable on the tubular and at the other end with at least one of the protective rings to bias the first and second protective rings and the transition ring formation to thereby form a protective shield along the entire zone of multiple consecutive tubulars to be protected.

8. A protective joint according to claim 7 wherein at least one transition ring formation comprises:

at least one transition ring having first and second faces and being coaxially disposed with respect to the inside longitudinal axis of the tubular, said transition ring being engagable on its first face with at least one of the first protective rings and engagable on its second face with at least one supporting ring, said transition ring having an inside diameter approximately equal to the inside diameter of the first protective rings and an outside diameter varying from the outside diameter of the protective ring at the transition ring's first face to an expanded outside diameter at the transition ring's second face; said supporting ring having first and second faces and being coaxially disposed with respect to the inside longitudinal axis of the tubular and along the first outside diameter portion of the tubular, said supporting ring having an inside diameter approximately equal to the inside diameter of the transition ring and an outside diameter approximately equal to the outside diameter of said second protective rings, said first face of the supporting ring being engagable with the second face of the transition ring; and at least one compensating ring having first and second faces and being coaxially disposed within the zone to be protected and along the longitudinal axis of the tubular, said compensating ring having an outside diameter approximately equal to the outside diameter of the supporting ring and an expanded inside diameter, said expanded inside diameter being sufficient to accommodate the increased diameter portion and, said compensating ring being engagable on its first face with the second face of the supporting ring and on its second face with the first face of a second protective ring.

9. A protective joint according to claim 7 wherein the biasing means comprises a plurality of wave springs coaxially located along the longitudinal axis of the body portion of the tubular and a plurality of spacing rings coaxially located along the body portion of the tubular and interspersed between the wave springs.

10. A protective joint according to claim 7 wherein the generally cylindrical annular protective rings and the transition ring formation comprise carbide rings.

11. A protective joint according to claim 7 wherein the permanent sleeve comprises a plurality of cylindrical segments coaxially locatable along the body portion of the tubular.

* * * * *